(12) United States Patent
Lee et al.

(10) Patent No.: US 11,916,244 B2
(45) Date of Patent: Feb. 27, 2024

(54) BATTERY MODULE INCLUDING PARTITION MEMBER

(71) Applicant: SK On Co., Ltd., Seoul (KR)

(72) Inventors: Seok Hwan Lee, Daejeon (KR); Hae Ryong Jeon, Daejeon (KR); Seung Hoon Ju, Daejeon (KR); Young Sun Choi, Daejeon (KR); Myeong Hwan Ma, Daejeon (KR); Sol San Son, Daejeon (KR)

(73) Assignee: SK On Co., Ltd., Seoul (KR)

( * ) Notice: Subject to any disclaimer, the term of this patent is extended or adjusted under 35 U.S.C. 154(b) by 197 days.

(21) Appl. No.: 17/122,146

(22) Filed: Dec. 15, 2020

(65) Prior Publication Data
US 2021/0184303 A1   Jun. 17, 2021

(30) Foreign Application Priority Data
Dec. 17, 2019 (KR) .................. 10-2019-0169027

(51) Int. Cl.
| | |
|---|---|
| *H01M 50/211* | (2021.01) |
| *H01M 10/6557* | (2014.01) |
| *H01M 10/647* | (2014.01) |
| *H01M 10/613* | (2014.01) |

(52) U.S. Cl.
CPC ....... *H01M 50/211* (2021.01); *H01M 10/613* (2015.04); *H01M 10/647* (2015.04); *H01M 10/6557* (2015.04)

(58) Field of Classification Search
CPC .. H01M 5/211; H01M 10/613; H01M 10/647; H01M 10/6557
See application file for complete search history.

(56) References Cited

U.S. PATENT DOCUMENTS

| | | | | |
|---|---|---|---|---|
| 5,585,204 A | * | 12/1996 | Oshida ................ | H01M 10/658 429/62 |
| 2010/0099023 A1 | * | 4/2010 | Kuroda ................ | H01M 50/51 429/159 |
| 2017/0331079 A1 | | 11/2017 | Yu et al. | |
| 2018/0331336 A1 | | 11/2018 | Choi et al. | |
| 2019/0165437 A1 | | 5/2019 | Kellner et al. | |
| 2021/0126313 A1 | | 4/2021 | Lee et al. | |
| 2023/0027497 A1 | | 1/2023 | Ju et al. | |

FOREIGN PATENT DOCUMENTS

| | | | | |
|---|---|---|---|---|
| CN | 205452481 U | * | 8/2016 | .......... H01M 10/613 |
| CN | 107331813 A | | 11/2017 | |
| CN | 108242521 A | | 7/2018 | |
| CN | 108370075 A | | 8/2018 | |
| CN | 110447125 A | | 11/2019 | |
| KR | 20160028951 A | * | 3/2016 | |
| KR | 1020160111216 A | | 9/2016 | |
| WO | WO-2011023515 A1 | * | 3/2011 | |
| WO | WO-2016197797 A1 | * | 12/2016 | .......... H01M 10/613 |

\* cited by examiner

*Primary Examiner* — Jimmy Vo
(74) *Attorney, Agent, or Firm* — The Webb Law Firm

(57) ABSTRACT

A battery module includes a module housing including a first plate in which one side is open, a second plate coupled with the first plate to form an internal space, and a partition member disposed across the internal space to couple the first plate with the second plate; and a battery cell stack disposed in the internal space, in which a plurality of battery cells are stacked.

19 Claims, 9 Drawing Sheets

BATTERY MODULE INCLUDING PARTITION MEMBER

CROSS-REFERENCE TO RELATED APPLICATION

This application claims priority to Korean Patent Application No. 10-2019-0169027 filed Dec. 17, 2019, the disclosure of which is hereby incorporated by reference in its entirety.

BACKGROUND OF THE INVENTION

1. Field of the Invention

The present disclosure relates to a battery module.

2. Description of Related Art

Unlike primary batteries, secondary batteries may be charged and discharged. Thus, secondary batteries may be applied to various fields of application such as digital cameras, mobile phones, laptop computers, hybrid vehicles, and the like. Examples of secondary batteries may include nickel-cadmium batteries, nickel-metal hydride batteries, nickel-hydrogen batteries, lithium secondary batteries, and the like.

Much research has been conducted into lithium secondary batteries, having high energy density and discharge voltages, among such secondary batteries. Recently, lithium secondary batteries have been manufactured as pouch-type battery cells having flexibility to be configured and used in the form of a module through the connection of a plurality of pieces.

When the battery module is used for an elongated period of time, heat may be generated by the battery module. In particular, an internal temperature of the battery module may be rapidly increased during a charging operation thereof. In this case, such an increase in temperature of the battery module may shorten a lifespan of the battery module and may decrease efficiency of the battery module. In the worst case, ignition or explosion may occur therein.

To address the above issues, a structure in which heat of a battery module is dissipated by forming a cooling flow path in a module housing has been applied. However, a battery module according to the related art cannot achieve sufficient cooling performance.

When a battery module is damaged by external mechanical factors such as crushing, crashes, vibrations, shocks, and the like, breakage of the battery module may occur or an accident such as a battery explosion may occur. However, a battery module according to the related art suffers from lack of rigidity to maintain a structure and has poor structural stability.

SUMMARY OF THE INVENTION

An aspect of the present disclosure is to provide a battery module having enhanced structural stability (rigidity).

An aspect of the present disclosure is to provide a battery module having improved cooling performance.

According to an aspect of the present disclosure, a battery module comprises a module housing including a first plate in which one side is open, a second plate coupled with the first plate to form an internal space, and a partition member disposed across the internal space to couple the first plate with the second plate t; and a battery cell stack disposed in the internal space, in which a plurality of battery cells are stacked.

The first plate may include a lower plate, supporting a lower portion of the battery cell stack, and side plates extending from both sides of the lower plate to support side surfaces of the battery cell stack.

The module housing may be further provided with a cover plate covering side surface of the internal space formed by the first plate and the second plate, and the partition member may be coupled to the cover plate.

The partition member may be formed to be integrated with the first plate or the second plate.

The partition member may be provided with a plurality of partition members disposed to be spaced apart from each other.

The battery module may further comprise a lower cooling member disposed on a lower surface of the first plate to cool the module housing. The first plate is provided with lower surface protrusion portions disposed on both ends thereof to protrude downwardly. A height which the lower surface protrusion portions protrude from the lower surface of the first plate is greater than or equal to a height which the lower cooling member protrudes from the lower surface of the first plate.

The battery module may further include an upper cooling member disposed on an upper surface of the second plate to cool the module housing. The second plate may be provided with upper surface protrusion portions disposed on both ends thereof to protrude upwardly. A height which the upper surface protrusion portion protrudes from an upper surface of the second plate, may be greater than or equal to a height which the upper cooling member protrudes from the upper surface of the second plate.

The battery module may comprise a bonding portion in which the side plates and the second plate are welded, and a side protrusion portion may be formed in a portion of a circumference of the bonding portion.

The side protrusion portion may be formed on each of the second plate and the side plates. In addition, the side protrusion portion may be formed to have a height greater than or equal to a height of the bonding portion.

The side plates may include a step portion in which a step is formed inwardly of a portion coupled to the second plate, and the step portion may be received in a step receiving portion formed to be recessed in a lower surface of the second plate.

A sealing member may be disposed between the step portion and the step receiving portion.

The battery module may further include a heat transfer member coupling the battery cell stack and the module housing to dissipate heat from the battery cell stack to the module housing.

The heat transfer member may be disposed between an upper surface of the battery cell stack and a lower surface of the second plate and between a lower surface of the battery cell stack and an upper surface of the lower plate.

The battery cell stack may be comprises a pouch type cell including an accommodation portion accommodating an electrode assembly, and a sealing portion sealing the accommodation portion. The heat transfer member may be disposed on a region in which the sealing portion is not disposed.

The sealing portion is formed to be folded and fixed with an adhesion member. The sealing portion may be disposed between the upper surface of the battery cell stack and the lower surface of the second plate and is not disposed between the lower surface of the battery cell stack and the upper surface of the lower plate.

The upper cooling member or the lower cooling member may comprise a contact portion in contact with the upper surface or the lower surface and a flow path portion spaced apart from the upper surface or the lower surface to form a cooling flow path through which a coolant flows. The battery module may comprise a buffer pad disposed between the battery cell stack and the partition member of the module housing.

BRIEF DESCRIPTION OF THE DRAWINGS

The above and other aspects, features, and advantages of the present disclosure will be more clearly understood from the following detailed description, taken in conjunction with the accompanying drawings.

DESCRIPTION OF THE INVENTION

Figure 1:
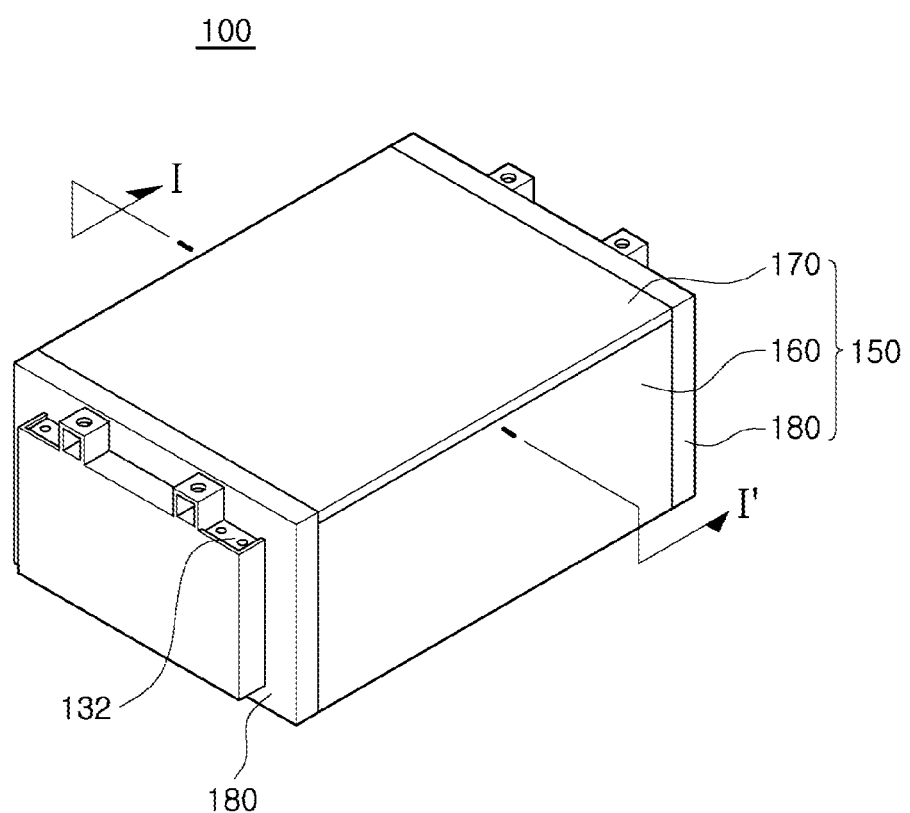
FIG. 1 is a perspective view of a battery module according to an example embodiment of the present disclosure.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the appropriate method he or she knows for carrying out the present disclosure. Therefore, the configurations described in the embodiments and drawings of the present disclosure are merely appropriate embodiments but do not represent all of the technical spirit of the present disclosure. Thus, the present disclosure should be construed as including all the changes, equivalents, and substitutions included in the spirit and scope of the present disclosure at the time of filing this application.

Hereinafter, embodiments of the present disclosure will be described in detail with reference to the accompanying drawings. In this case, it is to be noted that like reference numerals denote like elements in appreciating the drawings. Moreover, detailed descriptions related to well-known functions or configurations will be ruled out in order not to unnecessarily obscure the subject matter of the present disclosure. Based on the same reason, it is to be noted that some components shown in the drawings are exaggerated, omitted or schematically illustrated, and the size of each component does not exactly reflect its actual size.

Hereinafter, a battery module 100 according to an example embodiment will be described with reference to accompanying drawings.

Figure 2:
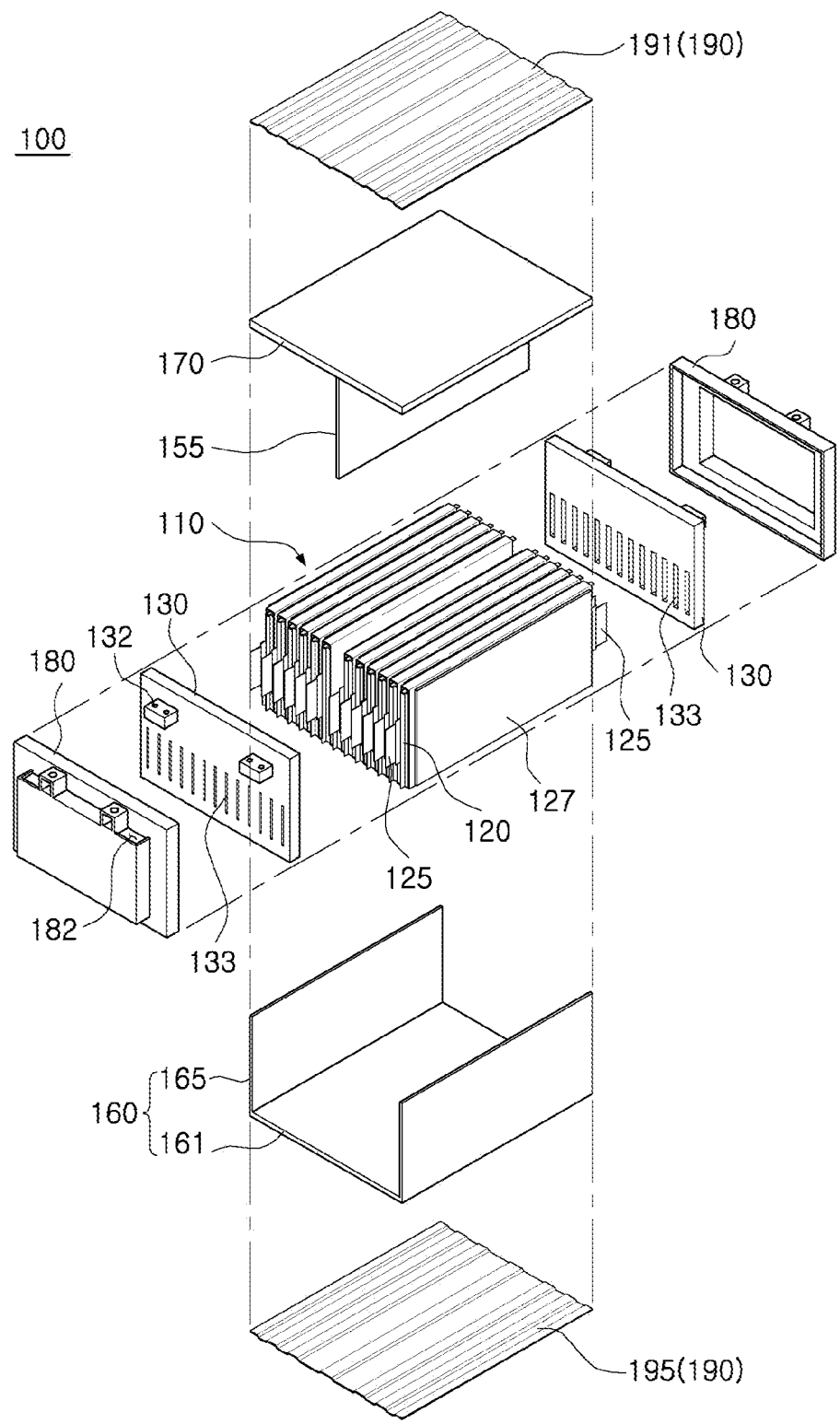
FIG. 2 is an exploded perspective view of the battery module illustrated in FIG. 1.
Figure 3:
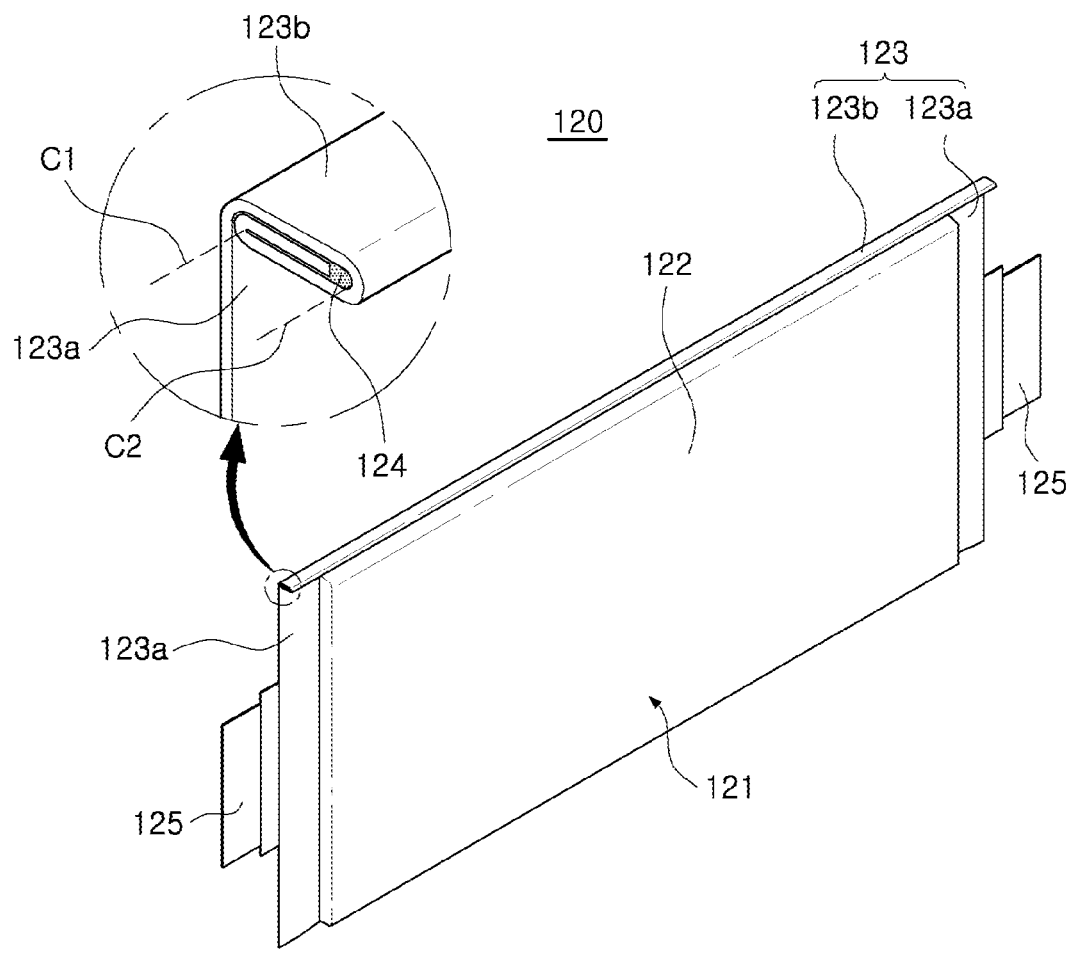
FIG. 3 is a perspective view illustrating an example of a battery cell.
Figure 4:
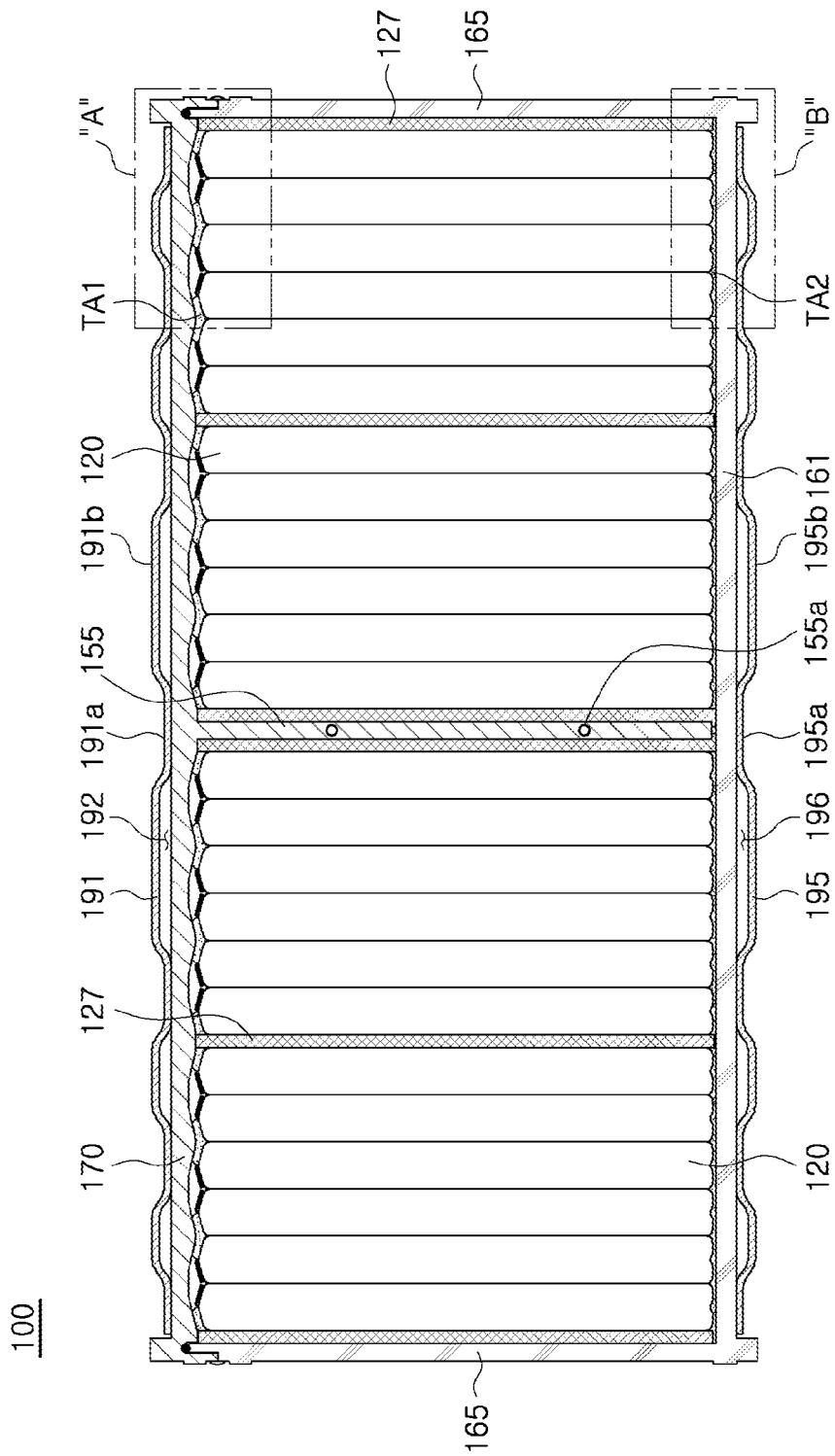
FIG. 4 is a schematic cross-sectional view take along line I-I' of FIG. 1.
Figure 5:
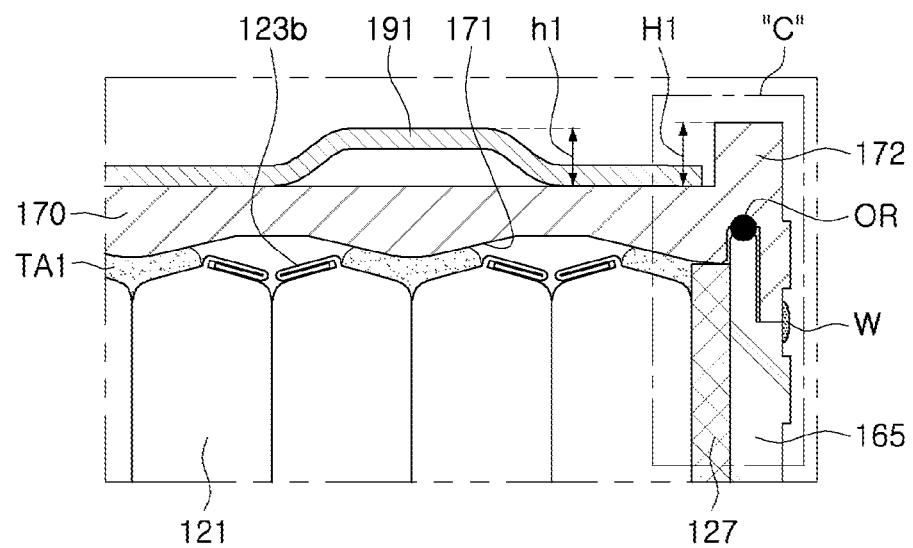
FIG. 5 is a partially enlarged view of portion "A" illustrated in FIG. 4.
Figure 6:
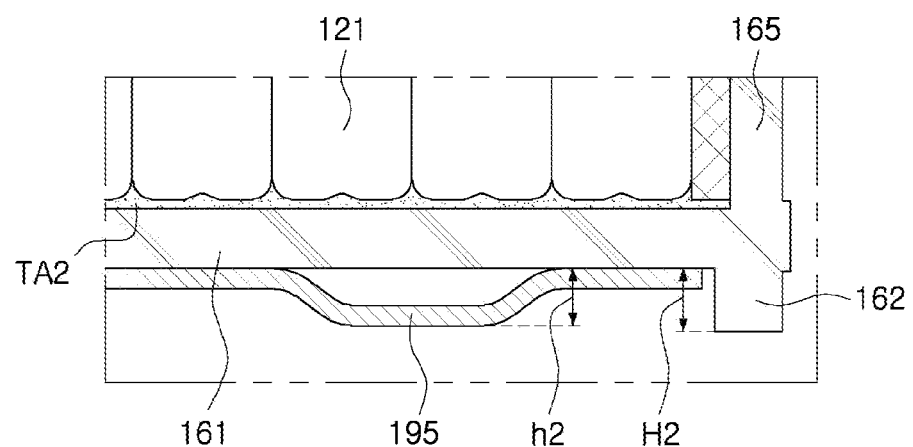
FIG. 6 is a partially enlarged view of portion "B" illustrated in FIG. 4.
Figure 7:
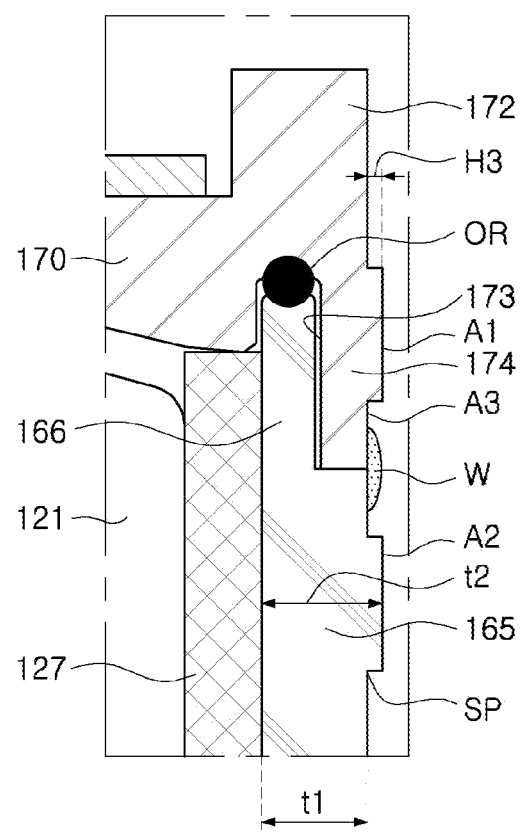
FIG. 7 is a partially enlarged view of portion "C" illustrated in FIG. 5.

FIG. 1 is a perspective view of a battery module 100 according to an example embodiment, FIG. 2 is an exploded perspective view of the battery module 100 illustrated in FIG. 1, FIG. 3 is a perspective view illustrating an example of a battery cell 120, FIG. 4 is a schematic cross-sectional view take along line I-I' of FIG. 1, FIG. 5 is a partially enlarged view of portion "A" illustrated in FIG. 4, FIG. 6 is a partially enlarged view of portion "B" illustrated in FIG. 4, FIG. 7 is a partially enlarged view of portion "C" illustrated in FIG. 5, and FIGS. 8 to 10 are schematic cross-sectional views illustrating various modified examples concerning a structure of a first plate 160, a second plate 170, and a partition member 155 constituting a module housing 150, respectively.

Referring to FIGS. 1 to 10, the battery module 100 according to an example embodiment may be configured to include a battery cell stack 110, a module housing 150, and a cooling member 190. The battery module 110 may further include heat transfer members TA1 and TA2.

Battery Cell Stack 110

As illustrated in FIG. 2, the battery cell stack 110 is configured by stacking a plurality of battery cells 120 illustrated in FIG. 3 as an example. In the present embodiment, the battery cells 120 are stacked in a left-right direction (or a horizontal direction). However, the battery cells 120 may be configured to be stacked in a vertical direction, as necessary.

Each of the battery cells 120 may be a pouch-type secondary battery, and may have a structure in which an electrode lead 125 protrudes outwardly thereof.

The battery cell 120 may be configured in such a manner that an electrode assembly, not illustrated, is accommodated in a pouch 121. The electrode assembly, not illustrated, may include a plurality of electrode plates and a plurality of electrode tabs, and may be accommodated in a pouch 121. The electrode plate may include a positive electrode plate and a negative electrode plate, and the electrode assembly may be formed by staking a positive electrode plate and a negative electrode plate with a separator interposed therebetween in such a manner that wide surfaces of the positive electrode plate and the negative electrode plate face each other. The positive electrode plate and the negative electrode plate may be formed by applying an active material slurry to a current collector. In general, the active material slurry may be prepared by stirring a granular active material, an auxiliary conductor, a binder, a plasticizer, and the like, in a state in which a solvent is added. In the electrode assembly, a plurality of positive electrode plates and a plurality of negative electrode plates are stacked in a left-right direction (or a horizontal direction). In this case, each of the positive electrode plates and the negative electrode plates may be provided with an electrode tab. The positive electrode plate and the negative electrode plate may be connected to the same electrode lead 125 by bringing the same polarities thereof into contact with each other.

In FIG. 3, the battery cell 120 is illustrated as two electrode leads 125 are disposed to face in directions opposite each other. However, the two electrode leads 125 may be disposed to face in the same direction while having different heights.

The pouch 121 may be formed in a container shape to provide an internal space in which an electrode assembly and an electrolyte, not illustrated, are accommodated. In this case, a portion of the electrode lead 125 of the electrode assembly may be exposed outwardly of the pouch 121.

The pouch 121 may be divided into an accommodation portion 122 and a sealing portion 123. The accommodation portion 122 may be formed in a container shape to provide a rectangular internal space. The electrode assembly and the electrolyte may be accommodated in the internal space of the accommodation portion 122.

The sealing portion 123 may be a portion, to which a portion of the pouch 121 is bonded, to seal an external surface of the accommodation portion 122. Accordingly, the sealing portion 123 may formed in the shape of a flange extending outwardly of the accommodation portion 122 formed in a container shape, and may be disposed along an external surface of the accommodation portion 122. A thermal fusion process may be used to bond the pouch 121 for forming the sealing portion 123, but the present disclosure is not limited thereto.

In the present embodiment, the sealing portion 123 is divided into a first sealing portion 123a, in which an electrode lead 125 is disposed, and a second sealing portion 123b in which the electrode lead 125 is not disposed.

In the present embodiment, the pouch 121 may be manufactured by forming a piece of exterior material. More specifically, the manufacturing of the pouch 121 may be completed by forming one or two accommodating portions on apiece of exterior material and folding the exterior material such that the accommodating portions form one space (for example, the accommodating portion 122).

In the present embodiment, the accommodation portion 122 may be formed to have a rectangular shape. An external surface of the accommodation portion 122 may be provided with the sealing portion 202 formed by bonding the exterior material. However, as described above, it is unnecessary to form the sealing portion 202 on a surface on which the exterior material is folded. Therefore, in the present embodiment, the sealing portion 202 may be formed on the external surface of the accommodating portion 204, and may be provided on only three sides of the accommodating portion 204 whereas the sealing portion 202 may be not disposed on any one side (a lower surface in FIG. 3) of the external surfaces of the accommodating portion 204.

In the present embodiment, since the electrode leads 125 are disposed to face in directions opposite each other, the two electrode leads 125 may be disposed in the sealing portions 123 formed on different sides. Accordingly, the sealing portion 123 may include two first sealing portion 123a, in which the electrode lead 125 is disposed, and one second sealing portion 123a in which the electrode lead 125 is not disposed. In FIG. 3, the second sealing portion 123b is illustrated as being formed on an upper surface of the pouch 121. However, the second sealing portion 123b may be formed on a lower surface of the pouch 121.

A structure of the pouch 121, applied to an example embodiment of the present disclosure, is not limited to a structure in which one piece of exterior material is folded to form the sealing portion 123 on three surfaces, as illustrated in FIG. 3. For example, the pouch 121 may have a structure in which an accommodation portion 122 is formed by overlapping two pieces of exterior material and sealing portions 123 are formed on all (four) sides of an external surface of the accommodation portion 122. In this case, the sealing portion 123 may include two first sealing portions 123a, in which the electrode lead 125 is disposed, and two second sealing portions 123b in which the electrode lead 125 is not disposed. The second sealing portions 123b may be formed on an upper surface and a lower surface of the battery cell 120.

In addition, the battery cell 120 according to the present embodiment may be manufactured in such a manner that the sealing portion 123 is folded at least once to enhance adhesion reliability of the sealing portion 123 and to significantly decrease an area of the sealing portion 123.

More specifically, in the sealing portion 123 according to the present embodiment, the second sealing portion 123b, in which the electrode lead 125 is not disposed, may be folded twice and then fixed by an adhesion member 124. For example, the second sealing portion 123b may be folded 180 degrees along a first folding line C1 illustrated in FIG. 3, and may then be folded again along a second folding line C2 illustrated in FIG. 3. In this case, the internal space of the second sealing portion 123b may be filled with the adhesion member 124. Accordingly, the second sealing member 123b may be maintained in a twice-folded shape by the adhesion member 124. The adhesive member 124 may be formed of an adhesive having high thermal conductivity. For example, the adhesive member 124 may be formed of epoxy or silicone, but the present disclosure is not limited thereto.

The above-configured battery cell 120 may be a nickel metal hydride (Ni-MH) battery or a lithium ion (Li-ion) battery, capable of charging and discharging electricity.

The battery cell 120 may be disposed in the internal space of the module housing 150 to be described later. A plurality of battery cells 120 may be horizontally stacked, while standing upright, to constitute the battery cell stack 110.

As illustrated in FIG. 4, at least one buffer pad 127 may be disposed between the battery cells 120 disposed to be stacked. A single or a plurality of buffer pads 127 may be disposed between accommodation portions 120 of an adjacent battery cell 120. Also, the buffer pad 127 may be disposed between the battery cell 120 and a side surface of the module housing 150. The buffer pad 127 may be disposed between the battery cell stack 110 and a partition member 155 of the module housing 150. Since the buffer pad 127 may be compressed and elastically deformed when a specific battery cell 120 swells, the buffer pad 127 may prevent an overall volume of the battery cell stack 110 from increasing. To this end, the buffer pad 127 may be formed of polyurethane foam, but the present disclosure is not limited thereto.

Module Housing 150

The module housing 150 may define an exterior of the battery module 100, and may be disposed outside the battery cell stack 110 to protect the battery cell 120 from an external environment. In this case, the module housing 150 according to the present embodiment may also serve to cool the battery module 100.

The module housing 150 may be configured to include a first plate 160 and a second plate 170. The first plate may have a cross-sectional shape in which one side is open, for example, a U-shaped cross-sectional shape (in the present specification, a U-shaped cross section has an angular shape on an edge thereof). The second plate 170 may be combined with the first plate 160 to form an internal space. Also, the module housing 150 may include cover plates 180 disposed on a front surface and a rear surface of the module housing 150 to cover the internal space formed by the first plate 160 and the second plate 170.

The battery cell stack 110 may be disposed in the internal space of the module housing 150, and at least one surface constituting the module housing 150 may serve as a heat dissipation plate to dissipate heat, generated within the battery cell 120, outwardly of the module housing 150.

In FIGS. 1, 2, and 4 to 10, the first plate 160 having a U-shaped cross section is illustrated as being disposed in a lower portion of the module housing 150, and the second plate 170 is illustrated as being disposed to be coupled to the first plate 160 in an upper portion of the module housing 150. However, the first plate 160 having a U-shaped cross section may be disposed in an upper portion of the module housing 150, and the second plate 170 may be disposed to be coupled to the first plate 160 in an upper portion of the module housing 150. For ease of description, a description will be given of a structure in which the first plate 160 is disposed in a lower portion of the module housing 150, as illustrated in FIGS. 1, 2, and 4 to 10.

As illustrated in FIGS. 2, 4, and the like, the first plate 160 may include a lower plate 161, supporting a lower portion of the battery cell stack 110, and a sideplate 165, supporting a side surface on which the accommodation portion 122 of the battery cell 120 is disposed, to form a U-shaped cross section in which one side is open. However, the side plate 165 and the lower plate 161 may be prepared as independent components and may then be coupled to/combined with each other, as necessary.

The side plate 165 may be formed to extend from both sides of the lower plate 161, and may be disposed on a side surface of the battery cell stack 110, disposed and stacked in the left-right direction, to support the accommodation portion 122 of the battery cell 120.

The side plates 165 may be configured to be in direct contact with the accommodation portions 204 of the battery cells 120 to securely support the battery cell stack 110. However, the present disclosure is not limited thereto, and various modifications may be made, as necessary. For example, a heat dissipation pad, the buffer pad 127, or the like, may be interposed between the side plate 165 and the accommodation portions 122 of the battery cell.

The above-configured first plate 160 may be formed of a material having high thermal conductivity such as a metal. For example, the first plate 160 may be formed of an aluminum material. However, the material of the first plate 160 is not limited thereto, and may be any non-metallic material as long as it has strength and thermal conductivity similar to those of a metal.

The second plate 170 (or an upper plate) may be disposed above the battery cell stack 110 to correspond to an upper surface of the battery cell stack 110. In addition, the second plate 170 may be coupled to an upper end of the side plate 165 of the first plate 160. Accordingly, when the second plate 170 is coupled to the first plate 160, the second plate 170 and the first plate 160 have a shape of a hollow tubular member.

Similarly to the first plate 160, the second plate 170 may be formed of a material having high thermal conductivity such as a metal. As an example, the second plate 170 may be formed of an aluminum material. However, the material of the second plate 170 is not limited thereto, and may be any non-metallic material as long as it has strength and thermal conductivity similar to those of a metal.

The module housing 150 may include a partition member 155 disposed across an internal space, formed in the module housing 150, to couple the first plate 160 and the second plate 170 to each other. As illustrated in FIG. 2, a plurality of battery cells 120 may be stacked between the partition member 155 and the side plate 165.

The partition member 155 may be vertically disposed inside the module housing 150 to resist vertical external factors. Thus, the partition member 155 may increase overall rigidity of the module housing 150 to reduce damage to the battery module 100 caused by mechanical external factors such as crushing, crashes, vibrations, shocks, and the like.

Figure 8:
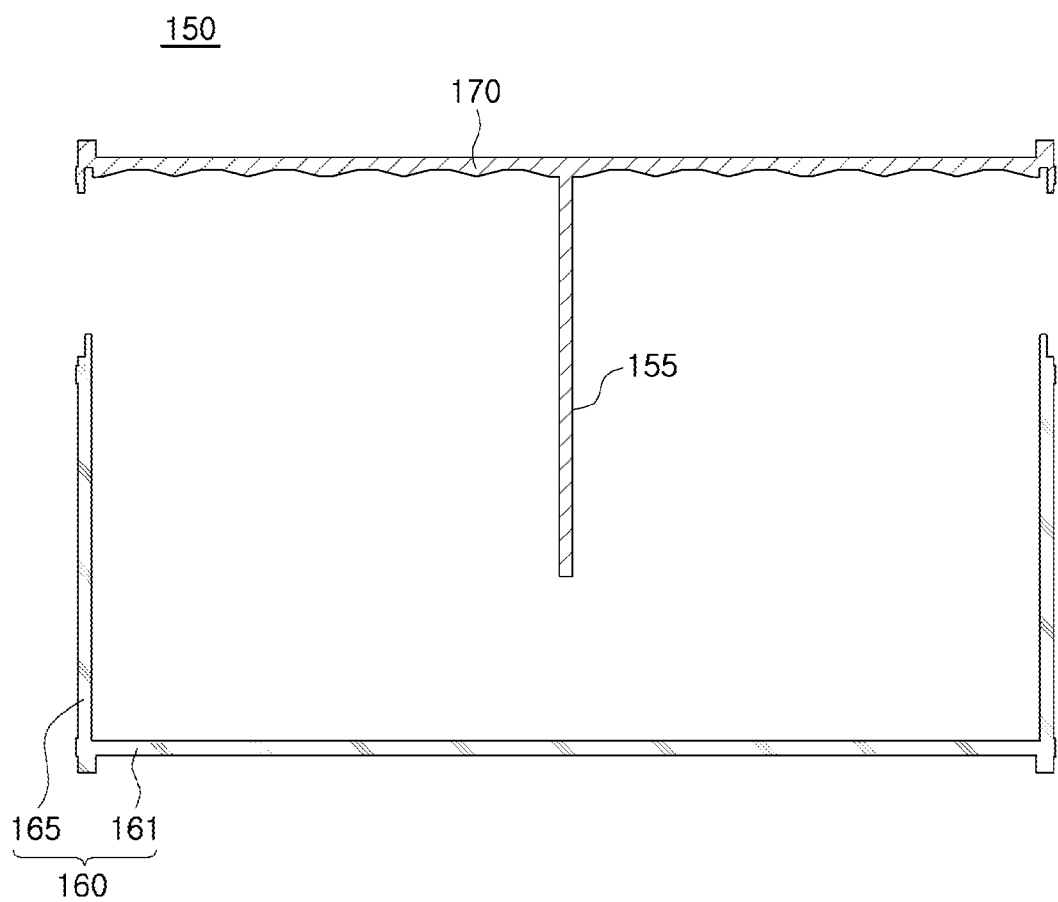
FIGS. 8 to 10 are schematic cross-sectional views illustrating various modified examples concerning a structure of a first plate, a second plate, and a partition member constituting a module housing, respectively.

As illustrated in FIGS. 2, 4 and 8, the partition member 155 may be formed to be integrated with the second plate 170 having a linear cross section, and may have a structure fixed to the lower plate 161 of the first plate 160 having a U-shaped cross section. For example, the second plate 170 and the partition member 155 may be integrally configured to have a T-shaped cross section. The partition member 155 and the first plate 160 may be coupled to each other using various known methods such as bolt (screw) fastening, welding, bonding, and the like.

Figure 9:
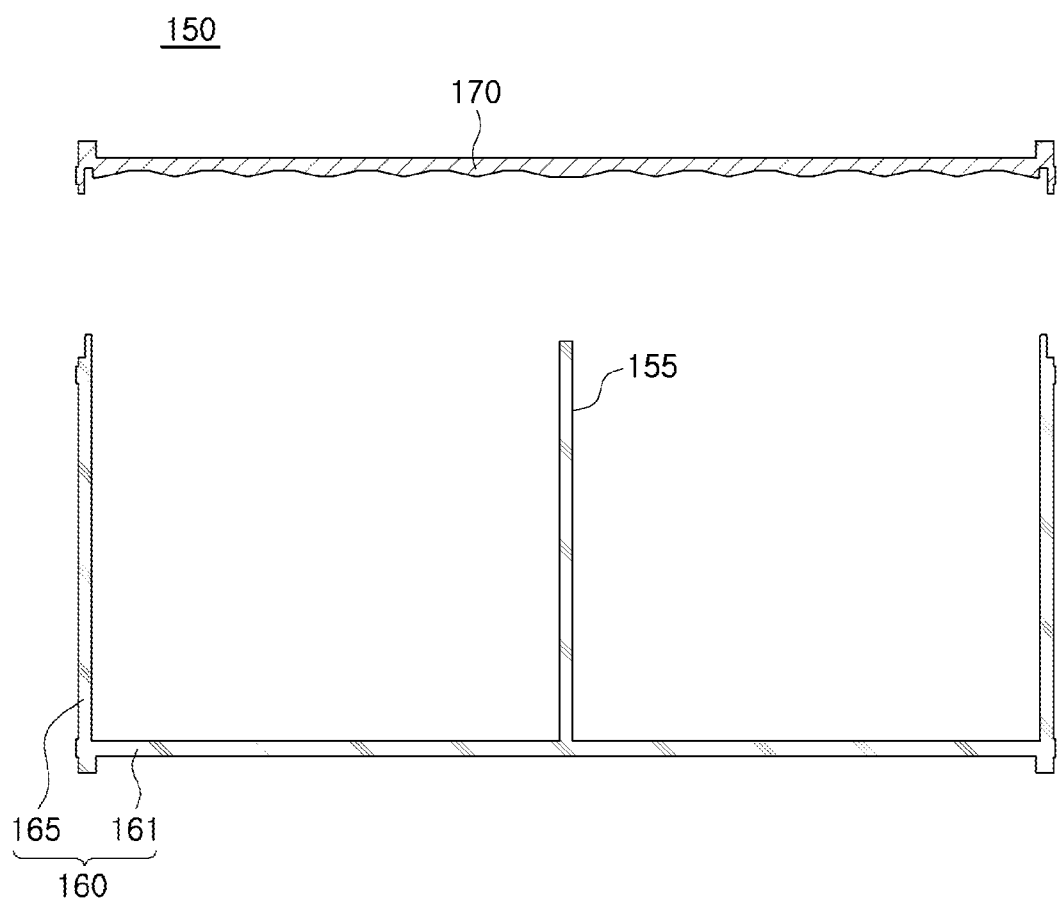

As illustrated in FIG. 9, the partition member 155 may be formed to be integrated with the lower plate 161 of the first plate 160 and may have a structure fixed to the second plate 170 having a U-shaped cross section. For example, the first plate 160 and the partition member 155 may be integrally configured to have a laterally lying E-shaped cross section. The partition member 155 and the second plate 170 may be coupled to each other using various known methods such as bolt (screw) fastening, welding, bonding, and the like.

Figure 10:
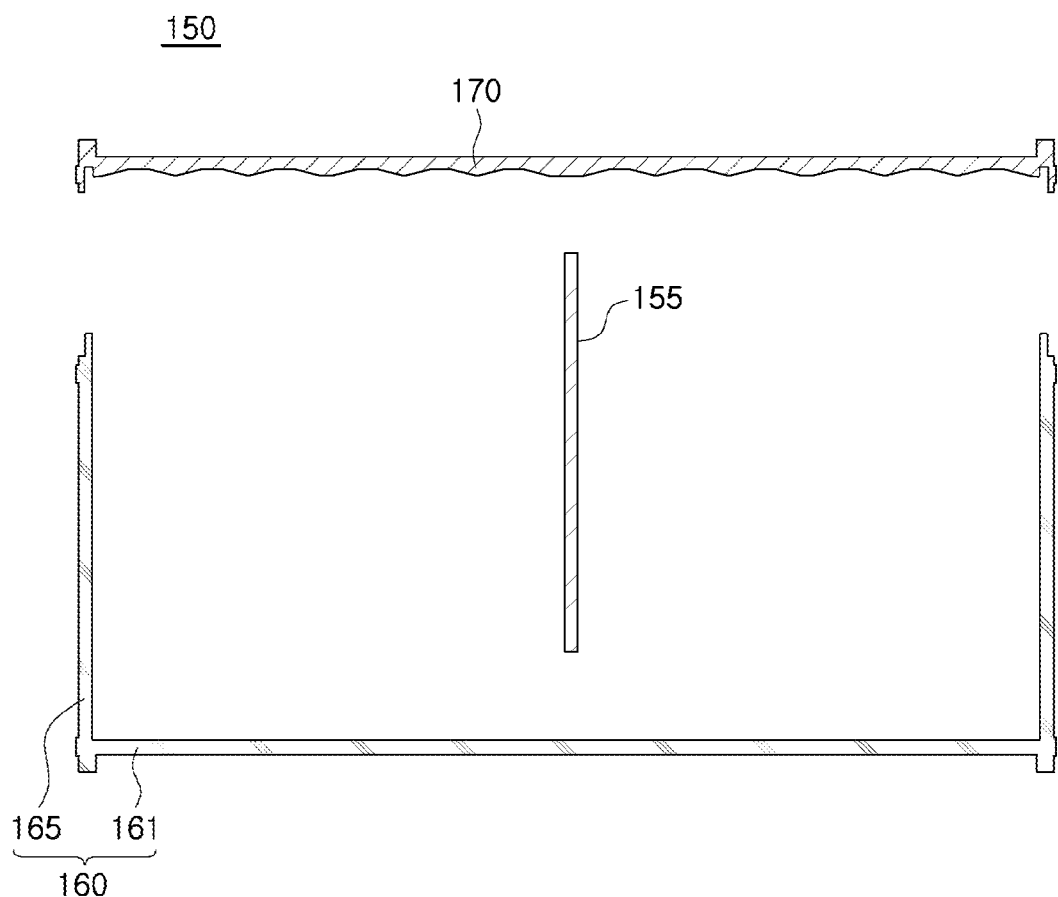

Alternatively, as illustrated in FIG. 10, the partition member 155 may be provided independently of the first plate 160 and the second plate 170 to be fixed to each of the first plate 160 and the second plate 170. The partition member 155 may be coupled to the first plate 160 and the second plate 170 using various known methods such as bolt (screw) fastening, welding, bonding, and the like.

Similarly to the first plate 160 or the second plate 170, the partition member 155 may be formed of a material having high thermal conductivity such as a metal. As an example, the partition member 155 may be formed of an aluminum material. However, the material of the partition member 155 is not limited thereto, and may be any non-metallic material as long as it has strength and thermal conductivity similar to those of a metal.

In addition, the partition member 155 may also be coupled to a front surface and a rear surface of the module housing 150 to increase the rigidity of the module housing 150. For example, the partition member 155 may be fixed to a cover plate 180 covering the front surface and the rear surface of the module housing 150. The partition member 155 may be fixed to the cover plate 180 using various known methods such as bolt (screw) fastening, welding, bonding, and the like. For example, the partition member 155 and the cover plate 180 may be coupled by a screw-coupling method. In this case, a fastening groove 155*a* for screw coupling may be formed in the partition member 155, as illustrated in FIG. 4.

In FIGS. 2, 4, and 8 to 10, the module housing 150 is illustrated as being provided with only one partition member 155. However, the module housing 150 may be provided with a plurality of partition members 155. For example, a plurality of partition members 155 may be disposed to be spaced apart from each other, and a plurality of battery cells 120 may be stacked between the partition members 155 or between the partition member 155 and the side plate 165.

The first plate 160 and the second plate 170 may be coupled to each other by welding a contact surface between the side plate 165 and the second plate 170 (for example, laser welding, or the like).

Referring to FIG. 7, the side plate 165 and the second plate 170 of the first plate 160 may be welding-coupled to each other in a bonding portion W formed to elongate along the contact surface between the side plate 165 and the second plate 170. In this case, the bonding portion W may have a shape protruding outwardly of a side surface due to a welding bead formed by the welding coupling. Since the bonding portion W is vulnerable to external impact, it is necessary to prevent damage to the boding portion W.

According to an example embodiment, side protrusion portions A1 and A2, protruding in a height direction of the boding portion W (the left-right direction in FIG. 7), may be formed in at least a portion of an external surface of the bonding portion W to prevent damage to the bonding portion W and to protect the bonding portion W. Therefore, the contact surface between the side plate 165 and the second plate 170 may be disposed in a portion recessed to a lower level than the side protrusion portions A1 and A2, for example, in a recessed portion A3 between the side protrusion portions A1 and A2.

In this case, the side protrusion portions A1 and A2 may be formed on a side surface of the second plate 170 and a side surface of the side plate 165, respectively, to protect the bonding portion W on an upper side and a lower side of the bonding portion W. The side protrusion portions A1 and A2 may elongate along the contact surface between the side-plate 165 and the second plate 170. However, the side protrusion portions A1 and A2 do not need to be continuously formed, and may be intermittently formed on the upper and lower sides of the bonding portion W in the case in which the bonding portion W may be protected.

A height H3 of each of the side protrusion portions A1 and A2 may be greater than or equal to, in detail, greater than a height of the welding bead formed by the bonding portion W (for example, a height of protruding in a direction of the side surface) to prevent the bonding portion W from protruding outwardly of the side protrusion portions A1 and A2.

Referring to FIG. 7, the side plate 165 may be provided with a step portion 166 in which a step is formed inwardly of an upper side portion coupled to the second plate 170. The step portion 166 may be received in a step receiving portion 173 formed to be recessed in a lower surface 171 of the second plate 170.

In addition, the second plate 170 may be provided with an extension portion 174 protruding outwardly of the step receiving portion 173 to correspond to a side surface of the step portion 166.

As described above, the contact area between the side plate 165 and the second plate 170 may be increased through an insertion coupling structure, in which the step portion 166 is inserted in the step receiving portion 173, and/or an overlap coupling structure of the step portion 166 and the extension portion 174. Thus, rigidity of a bonded portion may be increased.

In addition, since a plurality of steps are formed through the step portion 166 and the step receiving portion 173, it may be difficult for external moisture to permeate into the module housing 150. In particular, when a sealing member OR is disposed between the step portion 166 and the step receiving portion 173, external moisture may be securely prevented from permeating into the module housing 150. The sealing member OR may be a known sealing material, for example, rubber such as ethylene-propylene-diene monomer (EPDM), silicone, a butyl-based material, or the like.

However, the coupling of the first plate 160 and the second plate 170 is not limited to the above-described welding coupling, and may be performed using various modified methods. For example, the coupling of the first plate 160 and the second plate 170 may be performed using a sliding manner, bonding, or a fixing member such as a bolt or a screw.

While repeatedly charging and discharging electricity, the battery module 100 may suffer from swelling in which the battery cell 120 expands in a direction of the side plate 165 of the module housing 150 to cause a portion of the side plate 165 to be convexly deformed. Due to the swelling, stress may be concentrated on a bonding portion W, relatively vulnerable to the stress, to damage the bonding portion W.

To prevent such damage to the bonding portion W and to sufficiently resist the swelling, a side protrusion portions A2 may be formed on a portion of the side plate 165 disposed below the bonding portion W, and the side plate 165 disposed below the side protrusion A2 may be formed to have a thickness t1 less than a thickness t2 of the side protrusion A2, as illustrated in FIG. 7.

Specifically, when swelling occurs, a central portion of the side plate 165 in a height direction 165 may be most swollen and deformation force may act on upper and lower sides of the side plate 165, and stress may be concentrated on a relatively vulnerable portion. According to the present embodiment, since the thickness t1 of the side plate 165 disposed below the side protrusion portion A2 is less than the thickness t2 of the side protrusion portion A2, a point in which swollen deformation starts, for example, a swelling point (SP in FIG. 7) may be formed in a lower step portion of the side protrusion portion A2. For example, according to the present embodiment, since the deformation force caused by the swelling is not transferred to the bonding portion W but is concentrated on a lower step portion of the side protrusion portion A2, damage to or breakage of the bonding portion W, occurring when the stress is concentrated on the bonding portion W, may be prevented. Thus, structural stability (rigidity) of the module housing 150 and the battery module 100 may be significantly improved.

The cover plate 180 may be coupled to both side surfaces on which the electrode lead 125 of the battery cell 120 is disposed, for example, the front and rear surfaces of the module housing 150, based on what is illustrated in FIG. 1.

As illustrated in FIG. 2, the cover plate 180 may be coupled to the first plate 160 and the second plate 170 to form an exterior of the module housing 150 together with the first plate 160 and the second plate 170.

The cover plate 180 may be formed of a metal such as aluminum (A1), and may be manufactured by a process such as die casting, extrusion/pressing, or the like. In addition, the cover plate 180 may have a through-hole 182 for exposing a connection terminal 132 of an insulating cover 130 to be described later to an external entity.

The cover plate 180 may be coupled to the first plate 160 and the second plate 170 through a fixing member such as a screw or a bolt. However, the coupling method of the cover plate 180 is not limited thereto.

Referring to FIG. 2, the insulating cover 130 may be interposed between the cover plate 180 and the battery cell stack 110.

The insulating cover 130 may be coupled to one surface or both surfaces of the battery cell 120 on which the electrode lead 125 is disposed. The electrode leads 125 may penetrate through the insulation cover 130 to be connected to each other outside the insulation cover 130. To this end, the insulating cover 130 may be provided with a plurality of through holes 133 into which the electrode leads 125 are inserted.

In addition, the insulating cover 130 may be provided with a connection terminal 132 for connection to an external entity. Therefore, the battery cell 120 is electrically connected to the external entity through the connection terminal 132. To this end, the electrode lead 125 may be electrically connected to the connection terminal 132 through a circuit wiring, not illustrated, provided in the insulating cover 130. Such a circuit wiring may perform electrical connection depending on serial/parallel connection of modules through a bus bar formed of a copper material.

The connection terminal 132 may be exposed to an external entity through the through-hole 182 formed in the cover plate 180, as illustrated in FIG. 1. Accordingly, the through-hole 182 of the cover plate 180 may be formed to have a size corresponding to a size and a shape of the connection terminal 132.

In addition, the insulating cover 130 may include a circuit board (for example, a printed circuit board (PCB)) and a plurality of electronic devices such as a sensor, mounted on the circuit board, and the like. Thus, the insulating cover 130 may serve to sense a voltage of the battery cell 120.

Cooling Member 190

Referring to FIG. 2 and FIGS. 4 to 6, the cooling member 190 may be attached to at least one of an external surface of the first plate 160 and an external surface of the second plate 170 to cool the plate 160 and/or the second plate 170. For example, the cooling member 190 may dissipate heat, transferred to the first plate 160 through a lower surface of the battery cell stack 110, and/or heat transferred to the second plate 170 through an upper surface of the battery cell stack 110. Since the partition member 155 is coupled to the first plate 160 and/or the second plate 170, the cooling member 190 may dissipate the heat transferred to the first plate 160 and/or the second plate 170 from the partition member 155. As describe above, since the heat inside the module may also be dissipated through the partition member 155, a heat transfer path may be expanded by mounting the partition member 155. Thus, cooling performance of the module may be improved.

In order to effectively dissipate heat transferred from an upper portion and a lower portion of the battery cell stack 110 to improve cooling performance, the cooling members 190 may be attached to an eternal surface of the cooling member 190 and an external surface of the second plate 170 to cool the first plate 160 and the second plate 170, respectively.

To this end, the cooling member 190 may include at least one of an upper cooling member 191, disposed on an upper surface of the second plate 170, and a lower cooling member 195 disposed on a lower surface of the lower plate 161.

The upper cooling member 191 may be provided with a contact portion in contact with an upper surface of the second plate 170 and a flow path portion 191b spaced apart from the upper surface of the second plate 170 to form a cooling flow path 192 through which a coolant flows.

The lower cooling member 195 may be provided with a contact portion 195a in contact with a lower surface of the lower plate 161 and a flow path portion 195b spaced apart from the lower surface of the lower plate 161 to form a cooling flow path 196.

In this case, coupling of the upper cooling member 191 and the second plate 170 and coupling of the lower cooling member 195 and the lower plate 161 may be performed using a known bonding method such as brazing, or the like.

The cooling member 190 may be a water-cooled cooling device in which a cooling liquid flows through the cooling paths 192 and 196. However, the configuration of the cooling member 190 applied to the present disclosure is not limited thereto, and the cooling member 190 may be an air-cooled cooling device in which a gas such as air flows through the cooling paths 192 and 196.

As described above, the cooling member 190 may be coupled to the second plate 170 and/or the lower plate 161 using brazing.

In the case of such bonding using brazing, the cooling member 190 may be heated to soften a material of the cooling member 190, and thus, rigidity may be reduced. Therefore, the cooling member 190 may be vulnerable to external impact, or the like.

In view of the foregoing, according to an example embodiment, upper surface protrusion portion portions 172 may be formed on both ends of the second plate 170 to protrude upwardly of the upper cooling member 191 so as to protect the upper cooling member 191. Referring to FIG. 5, a height H1 at which the upper surface protrusion portion 172 formed on the second plate 170 protrudes from an upper surface of the second plate 170 may be greater than or equal to a height h1 at which the upper cooling member 191 protrudes from the upper surface of the second plate 170.

As described above, since the upper protrusion portion 172 may be formed on the second plate to have the height H1 greater than or equal to, in detail, greater than the height h1 of the upper cooling member 191, the upper cooling member 191 may be protected from external impact applied from an upper side of the module housing 150.

Similarly, a lower surface protrusion portion 162 may be formed on both ends of the lower plate 161 to protrude downwardly of the lower plate 161. Referring to FIG. 6, a height H2 at which the lower protrusion portion 162 formed on the lower plate 161 protrudes from a lower surface of the lower plate 161 may be greater than or equal to a height h2 at which the lower cooling member 195 protrudes from the lower surface of the lower plate 161.

As described above, since the height H2 of the lower surface protrusion 162 formed on the lower plate 161 is greater than or equal to, in detail, greater than the height h2 of the lower cooling member 195, the lower cooling member 195 may be protected from external impact applied from the lower side of the module housing 150.

Heat Transfer Members TA1 and TA2

The heat transfer members TA1 and TA2 may couple the battery cell stack 110 and the module housing 150 to each other to dissipate heat from the battery cell stack 110 to the module housing 150. For example, one side of each of the heat transfer members TA1 and TA2 may be in contact with the battery cell stack 110 and the other side thereof may be in contact with the module housing 150 to transfer heat, generated within the battery cell 120, to the module housing 150.

For example, as illustrated in FIGS. 4 to 6, the heat transfer members TA1 and TA2 may be disposed between an upper surface of the battery cell stack 110 and a lower surface 171 of the second plate 170 and/or between a lower surface of the battery cell stack 110 and an upper surface of the plate 160. FIGS. 4 to 6 illustrate an example in which heat transfer members TA1 and TA2 are disposed on both an upper portion and a lower portion of the battery cell stack 110. However, the configuration of the present disclosure is not limited thereto. As necessary, the heat transfer members TA1 and TA2 may be omitted or may be disposed in only one of the upper and lower portions of the battery cell stack 110.

Referring to FIGS. 4 and 5, the heat transfer member TA1 may be disposed between the upper surface of the battery cell stack 110 and the lower surface 171 of the second plate 170 to dissipate heat from the battery cell stack 110 to the second plate 170.

Referring to FIG. 3, when the sealing portion 123 is formed on three sides by folding a piece of exterior material, the second sealing portion 123b, on which the electrode lead 125 is not disposed, may be formed in only one of the upper and lower portions of the battery cell stack 110. One the other hand, when the sealing portion 123 is formed on four sides by overlapping two pieces of exterior material, the second sealing portion 123b, on which the electrode lead 125 is not disposed, may be formed on both the upper and lower portions of the battery cell stack 110.

In this case, the heat transfer member TA1 may be configured to couple the upper surface of the battery cell stack 110 and the lower surfaced 171 of the second plate 170 to each other in a region, in which the sealing portion 123 (the second sealing portion 123b) is not disposed, in the upper surface of the battery cell stack 110.

Specifically, as illustrated in FIG. 5, the second sealing portion 123b of the battery cell 120 may have a structure folded and then bent to one of the left and right sides. As described above, since the second sealing portion 123b has a structure bonded (sealed) and then folded, an air space may be formed in a portion, in which folded surfaces overlap each other, and/or between a folded portion and the accommodation portion 122. Accordingly, even when the heat transfer member TA1 is disposed to cover the second sealing portion 123b, heat transfer efficiency may be reduced due to the air space. Meanwhile, in the case of the region, in which the second sealing portion 123b is not disposed, in the upper surface of the battery cell stack 110, the upper surface of the battery cell 120 may be in direct contact with the heat transfer member TA1 to improve heat transfer efficiency between the battery cell stack 110 and the heat transfer member TA1. Therefore, when the heat transfer member TA1 is disposed in a region in which the sealing portion 123 (the second sealing portion 123b) is not disposed, the amount of use of the heat transfer member TA1 may be reduced while achieving sufficient heat transfer efficiency. However, in the present disclosure, a location of the heat transfer member TA1 is not limited to the above-mentioned region in which the second sealing portion 123b is not disclose, and the heat transfer member TA1 may be disposed on an entire upper surface of the memory cell 120 including the second sealing portion 123b.

As illustrated in FIG. 5, the lower surface 171 of the second plate 170 may have a shape in which a portion, in which the heat transfer member TA1 is disposed, protrudes downwardly of the second plate 170 in a V-shape. As described above, since the lower surface 171 of the second plate 170 has a protruding shape, the amount of use of the heat transfer member TA1 may be reduced and a contact area with the heat transfer member TA1 may be increased, as compared with a case in which the lower surface 171 of the second plate 170 has a flat structure. In addition, the second plate 170 may serve to guide and maintain a stacking location of the battery cell 120.

In addition, referring to FIGS. 4 and 6, the heat transfer member TA2 may be disposed between the lower surface of the battery cell stack 110 and the upper surface of the lower plate 161 to dissipate heat from the battery cell stack 110 to the lower plate 161. In the case of the battery cell 120 illustrated in FIGS. 4 and 6, the second sealing portion 123b is not disposed on the lower surface of the battery cell 120, so that the heat transfer member TA2 may be disposed overall between the lower surface of the battery cell stack 110 and the upper surface of the lower plate 161.

As described above, the second sealing portion 123b, on which the electrode lead 125 is not disposed, may also be disposed in a lower portion of the battery cell 120. When the second sealing portion 123b is disposed in a lower portion of the battery cell 120, the heat transfer member TA2 may be configured to couple the lower surface of the battery cell stack 110 and the lower plate 161 to each other in a region, in which the second sealing portion 123b is not located, so as to sufficiently achieve heat transfer efficiency and reduce the amount of use of the heat transfer member TA1. However, in the present disclosure, a location of the heat transfer member TA2 is not limited to the region in which the second sealing portion 123b is not disposed, as described above. The heat transfer member TA2 may be disposed on an entire lower surface of the battery cell 120 including the second sealing portion 123b.

The configurations of the heat transfer members TA1 and TA2 may allow the heat, generated within the battery cell 120, to be effectively transferred to the second plate 170 and/or the lower plate 161 due to high thermal conductivity of the heat transfer members TA1 and TA2, and then may allow the heat to be sufficiently dissipated through the cooling member 190 (an upper cooling member 191) and/or the lower cooling member 195.

The heat transfer members TA1 and TA2 may be configured to include at least some of a thermal grease, a thermal adhesive, thermally conductive epoxy, and a heat dissipation pad to facilitate heat transfer. However, the present disclosure is not limited thereto.

The heat transfer members TA1 and TA2 may be disposed between the upper surface of the battery cell stack 110 and the lower surface 171 of the second plate 170 and/or between the lower surface of the battery cell stack 110 and the upper surface of the first plate 160 in the form of pads, or may be applied in a liquid or gel state to be formed.

In addition, when the heat transfer members TA1 and TA2 are configured to couple the upper surface of the battery cell stack 110 and the lower surface 171 of the second plate 170 to each other and to couple the lower surface of the battery cell stack 110 and the upper surface of the first plate 160 to each other, both the upper surface and the lower surface of the battery cell stack 110 may be coupled to the module housing 150. For example, due to adhesive performance of the heat transfer members TA1 and TA2, the battery cell stack 110 may be integrated with the module housing 150 via the heat transfer members TA1 and TA2. Thus, overall rigidity of the battery module 100 may be increased.

The heat transfer members TA1 and TA2 according to the present embodiment may be configured to have high insulation property and may include, for example, a material having dielectric strength ranging from 10 to 30 KV/mm. In the case in which such a material having high insulation property is used, insulation between the battery cell stack 110 and the module housing 150 may be maintained by the heat transfer members TA1 and TA2 disposed around the battery cell stack 110 even when partial insulation breakdown occurs in the battery cell 120.

As described above, in a battery module according to an example embodiment, structural stability (rigidity) of a battery module may be improved through a partition member provided inside a module housing.

In addition, in a battery module according to an exemplary embodiment, damage to a cooling member attached to an upper portion and/or a lower portion of a module housing may be reduced.

In addition, in a battery module according to an example embodiment, damage caused by external impact, directly applied to a bonding portion of a module housing, may be significantly reduced.

In addition, in a battery module according to an example embodiment, a swelling compensation structure may be provided to prevent a bonding portion of a module housing from fracturing when stress is concentrated on the bonding portion.

In addition, in a battery module according to an example embodiment, a battery cell may be integrated with a module housing to be fixed thereto. Thus, structural rigidity may be enhanced and heat dissipation performance may be improved.

In addition, in a battery module according to an example embodiment, cooling performance of a battery cell may be improved. Thus, overall cooling performance of the battery module may be improved.

In addition, in a battery module according to an example embodiment, heat generated within a battery cell may be dissipated through a cooling member via a first plate and a second plate, respectively disposed in an upper portion and a lower portion of the battery cell. Thus, cooling efficiency may be increased. In an example embodiment in which a partition member is provided, heat inside the module may be dissipated through the partition member to expand a heat transfer path and to further improve cooling performance.

In addition, in a battery module according to an example embodiment, the amount of use of a thermally conductive member, applied to an upper portion and/or a lower portion of a battery cell, may be reduced.

While exemplary embodiments have been shown and described above, it will be apparent to those skilled in the art that modifications and variations could be made without departing from the scope of the present disclosure as defined by the appended claims.

What is claimed is:

1. A battery module comprising:
   a module housing including a first plate in which one side is open, a second plate coupled with the first plate to form an internal space, a partition member disposed across the internal space to couple the first plate with the second plate, and a cover plate covering a side surface of the internal space formed by the first plate and the second plate;
   a battery cell stack disposed in the internal space, in which a plurality of battery cells are stacked; and
   an insulating cover interposed between the cover plate and the battery cell stack, the insulating cover is provided with a connection terminal electrically connecting the plurality of battery cells to an external entity,
   wherein the module housing forms a most exterior of the battery module,
   wherein the connection terminal is configured to be exposed to an outside of the module housing, and
   wherein the partition member is vertically disposed inside the module housing to increase rigidity of the module housing and is formed of a metal having thermal conductivity to dissipate heat inside the module housing through the partition member.

2. The battery module of claim 1, wherein the first plate comprises a lower plate supporting a lower portion of the battery cell stack, and side plates extending from both sides of the lower plate to support side surfaces of the battery cell stack.

3. The battery module of claim 2, wherein the partition member is coupled to the cover plate.

4. The battery module of claim 2, wherein the partition member is formed to be integrated with the first plate or the second plate.

5. The battery module of claim 1, wherein the partition member is provided with a plurality of partition members disposed to be spaced apart from each other.

6. The battery module of claim 1, further comprising:
   a lower cooling member disposed on a lower surface of the first plate to cool the module housing,
   wherein the first plate is provided with lower surface protrusion portions disposed on both ends thereof to protrude downwardly,
   a height which the lower surface protrusion portions protrude from the lower surface of the first plate is greater than or equal to a height which the lower cooling member protrudes from the lower surface of the first plate.

7. The battery module of claim 6, further comprising:
   an upper cooling member disposed on an upper surface of the second plate to cool the module housing,
   wherein the second plate is provided with upper surface protrusion portions disposed on both ends thereof to protrude upwardly, and
   a height which the upper surface protrusion portions protrude from the upper surface of the second plate is greater than or equal to a height which the upper cooling member protrudes from the upper surface of the second plate.

8. The battery module of claim 2, further comprising:
   a bonding portion in which the side plates and the second plate are welded; and
   a side protrusion portion formed in a portion of a circumference of the bonding portion.

9. The battery module of claim 8, wherein the side protrusion portion is formed on each of the second plate and the side plates.

10. The battery module of claim 8, wherein the side protrusion portion is formed to have a height greater than or equal to a height of the bonding portion.

11. The battery module of claim 2, wherein the side plates include a step portion in which a step is formed inwardly of a portion coupled to the second plate, and
    the step portion is received in a step receiving portion formed to be recessed in a lower surface of the second plate.

12. The battery module of claim 11, wherein a sealing member is disposed between the step portion and the step receiving portion.

13. The battery module of claim 2, further comprising:
    a heat transfer member coupling the battery cell stack and the module housing to dissipate heat from the battery cell stack to the module housing.

14. The battery module of claim 13, wherein the heat transfer member is disposed between an upper surface of the battery cell stack and a lower surface of the second plate and between a lower surface of the battery cell stack and an upper surface of the lower plate.

15. The battery module of claim 14, wherein the battery cell stack comprises a pouch type cell including an accommodation portion accommodating an electrode assembly and a sealing portion sealing the accommodation portion, and
    the heat transfer member is disposed on a region in which the sealing portion is not disposed.

16. The battery module of claim 15, wherein the sealing portion is formed to be folded and fixed with an adhesion member.

17. The battery module of claim 15,
wherein the sealing portion is disposed between the upper surface of the battery cell stack and the lower surface of the second plate and is not disposed between the lower surface of the battery cell stack and the upper surface of the lower plate.

18. The battery module of claim 7, wherein the upper cooling member or the lower cooling member comprises a contact portion in contact with the upper surface or the lower surface and a flow path portion spaced apart from the upper surface or the lower surface to form a cooling flow path through which a coolant flows.

19. The battery module of claim 1, further comprising:
a buffer pad disposed between the battery cell stack and the partition member of the module housing.

* * * * *